United States Patent [19]

Svenson

[11] 3,786,688

[45] Jan. 22, 1974

[54] VARIABLE RATIO BELT-TYPE TRANSMISSION HAVING IMPROVED DRIVEN PULLEY

[75] Inventor: Bert N. Svenson, Downey, Calif.

[73] Assignee: Instrument Systems Corporation, Jericho, N.Y.

[22] Filed: Apr. 16, 1973

[21] Appl. No.: 351,474

Related U.S. Application Data

[62] Division of Ser. No. 150,523, June 7, 1971.

[52] U.S. Cl. ................ 74/230.17 M, 74/230.17 A
[51] Int. Cl. ............................................. F16h 55/52
[58] Field of Search 74/230.17 M, 230.17 A, 230.17 R

[56] References Cited
UNITED STATES PATENTS

| 2,050,358 | /1936 | McElroy | 74/230.17 M |
| 2,135,348 | /1938 | McElroy | 74/230.17 M |
| 7,501,705 | /1924 | Decoux | 74/230.17 M |
| 2,478,289 | /1949 | Lemon | 74/230.17 M |

*Primary Examiner*—Charles J. Myhre
*Assistant Examiner*—R. H. Lazarus
*Attorney, Agent, or Firm*—Robert L. Parker et al.

[57] ABSTRACT

A variable ratio belt-type transmission. The transmission transmits power from a driving shaft of the engine to a driven shaft of the cycle when the engine is running, and transmits pedal-generated power from the driven shaft to the driving shaft to start the engine when it is not running.

21 Claims, 8 Drawing Figures

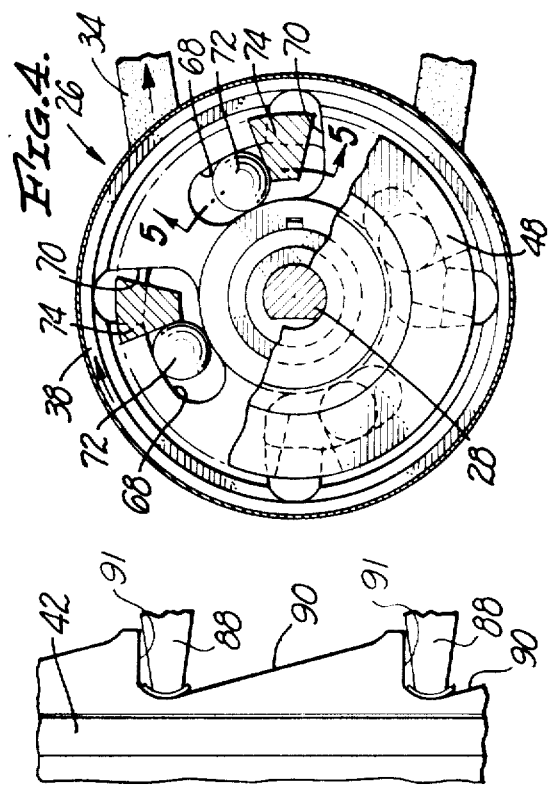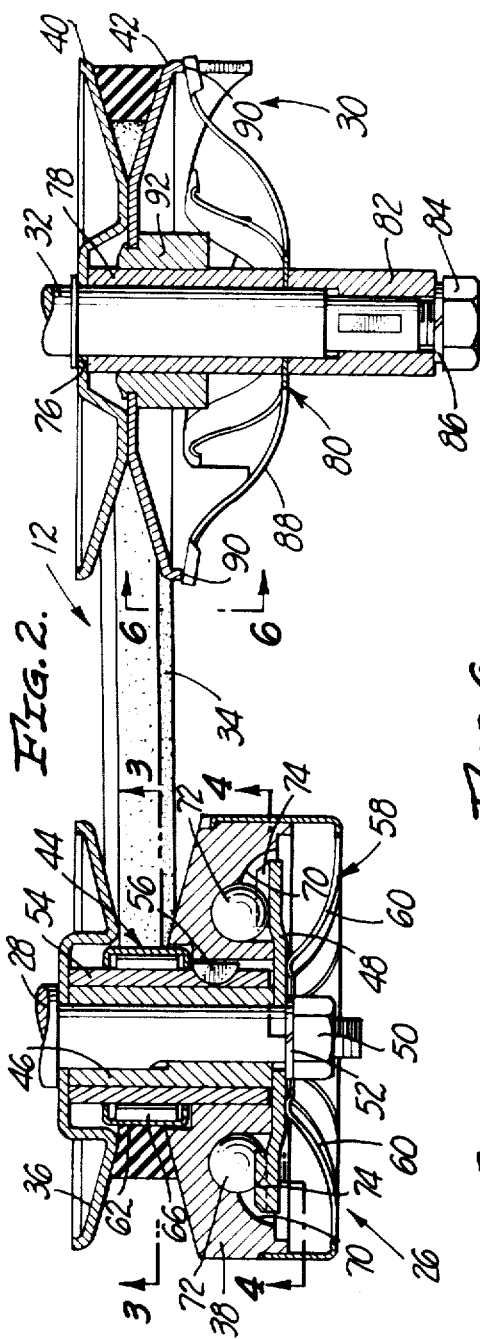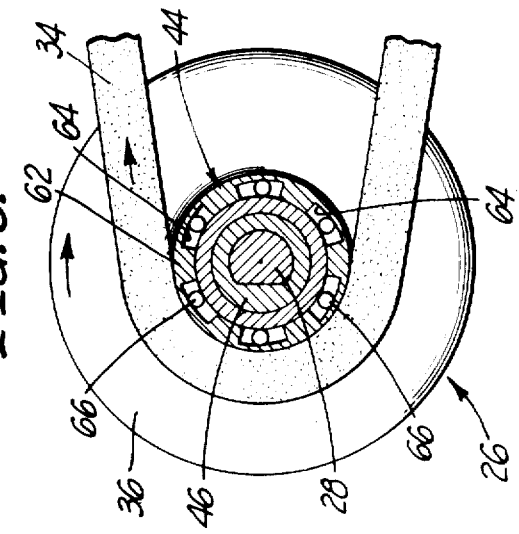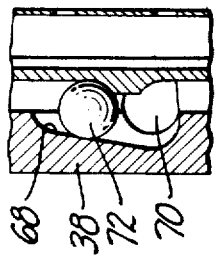

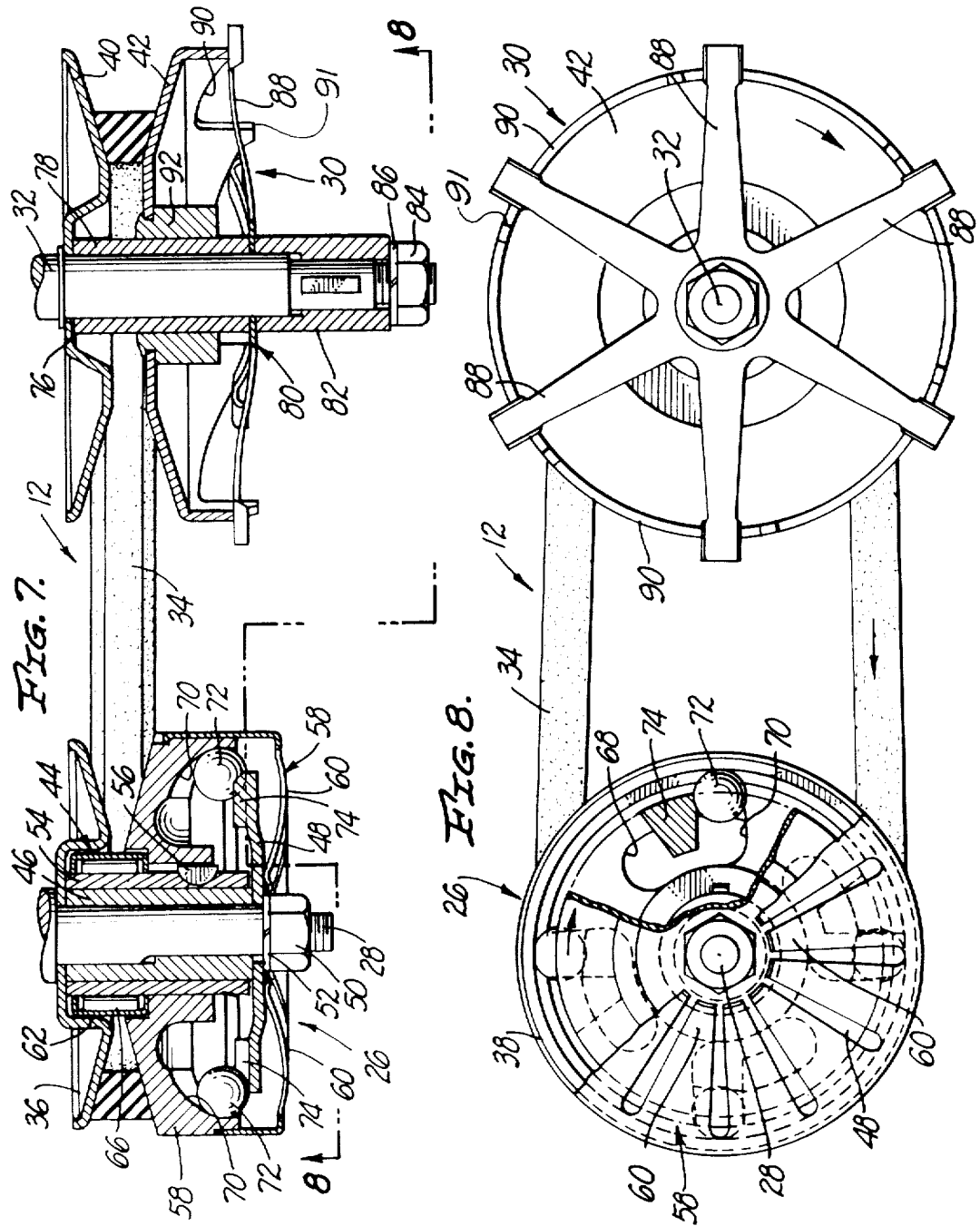

VARIABLE RATIO BELT-TYPE TRANSMISSION HAVING IMPROVED DRIVEN PULLEY

CROSS-REFERENCE TO RELATED APPLICATION

This application is a division of my co-pending application U.S. Ser. No. 150,523 filed June 7, 1971 entitled VARIABLE-RATIO BELT-TYPE TRANSMISSION FOR ENGINE-DRIVEN CYCLE, INCORPORATING PEDAL-OPERATED ENGINE STARTING MEANS filed in the name of Bert N. Svenson.

BACKGROUND OF THE INVENTION

The present invention relates in general to a variable ratio belt-type transmission for transmitting power from a driving shaft of an engine to a driven shaft when the engine is running and for transmitting power from the driven shaft to the driving shaft to start the engine when it is not running. The invention is particularly applicable to, and, for convenience, will be considered in connection with, a pedal-equipped engine driven cycle wherein pedal generated power is delivered to the driving shaft for engine starting purposes.

As further background, the variable ratio belttype transmission of the invention includes: a variable pitch diameter driving pulley on the driving or engine shaft and comprising two coaxial, relatively axially movable, generally frusto-conical driving pulley members; a variable pitch diameter driven pulley on the driven shaft and comprising two coaxial, relatively axially movable, generally frusto-conical driven pulley members; a V-belt trained around the driving and driven pulleys; overrunning clutch means on the driving shaft between the driving pulley members and engageable by the inner periphery of the belt; the clutch means being engaged when the driven pulley drives the belt, whereby the engine may be started by means of pedal-generated power applied to the driven shaft and delivered to the driving or engine shaft through the driven pulley, the belt and the clutch means; the clutch means being disengaged when the engine is running, whereby power may be transmitted from the driving shaft to the driven shaft through the driving pulley, the belt and the driven puley; and driving pulley closing means operable when the clutch means is disengaged, and responsive to the speed of rotation of the driving shaft for relatively moving the driving pulley members axially toward each other to increase the pitch diameter of the driving pulley, the pitch diameter of the driven pulley decreasing correspondingly.

With the foregoing construction, the engine with which the cycle is equipped may be started intially by pedaling, the pedal generated power being transmitted to the engine by automatic engagement of the overrunning clutch means in response to power application to the driven shaft. As soon as the engine starts, the overrunning clutch means disengages and power is transmitted from the driving pulley to the driven pulley through the belt in the normal manner for a transmission of this type. The speed-responsive driving pulley closing means causes the transmission ratio to shift "up" as the engine speed increases.

SUMMARY OF THE INVENTION

Briefly, a variable pitch diameter driven pulley belt drive according to the present invention is for mounting on a driven shaft. Included are two coaxial, relatively axially movable, generally frusto-conical driven pulley members for mounting on the shaft and between which a belt is passed. One of the driven pulley members is fixed and the other is movable relative to the fixed one in an axial direction. The movable driven pulley member has a plurality of circumferentially spaced cams. Each cam has a ramp surface. A spring mounts on the shaft and has a plurality of circumferentially spaced radially extending spring arms. Each arm has an outer end bearing on one of the ramp surfaces. The spring normally applies a spring force on the ramp surface forcing the movable driven pulley member towards the fixed pulley member.

Such a driven pulley allows the spring to act both as the compression spring and the torque member.

Preferably, a sleeve is affixed to the driven pulley member for mounting on the shaft and the driven pulley member is rotatably mounted on the sleeve.

Preferably, the spring has a central opening affixed to the sleeve and through which the shaft may extend.

According to a further preferred embodiment, a threaded member is provided for threaded engagement with threads on the driven pulley, and for securing the spring in an axial direction against the sleeve.

Preferably, a further sleeve is provided having a larger outer surface than the central opening in the spring. The further sleeve is positioned in between the threaded member and spring for engagement therebetween and for securing the spring in place against the first sleeve.

According to a preferred embodiment, the ramps are evenly spaced and symmetrically curved about the axis of rotation of the driven pulley.

Also according to a preferred embodiment, there is a stop at one end of each ramp. The ramps each extend from a ramp position adjacent each stop which is towards the fixed driven pulley member to a ramp position which is further away from the fixed driven pulley member. With such an arrangement, the driven pulley acts as a fixed pitch diameter pulley when its shaft is providing the driving torque, such by pedaling of a cycle. This occurs when the shaft is rotated in a direction which forces the arms against the stops. However, the pulley also becomes a variable pitch diameter pulley when the belt provides the driving torque to the driven pulley such as by power from the engine.

According to a further preferred embodiment of the invention, the driven pulley member is employed in a variable ratio belt-type transmission for transmitting power between a driving shaft and a driven shaft through the belt. Included with the aforementioned driven pulley is a variable pitch diameter driving pulley for mounting on such driving shaft and comprises two coaxial, relatively axially movable, generally frusto-conical driving pulley members between which the belt is passed.

DESCRIPTION OF THE DRAWINGS

FIG. 2 is a view similar to FIG. 1, but illustrating the condition of the transmission during pedal-induced starting of the engine;

FIGS. 3 and 4 are sectional views, respectively, taken as indicated by the arrowed lines 3—3 and 4—4 of FIG. 2;

FIG. 5 is a fragmentary sectional view taken as indicated by the arrowed line 5—5 of FIG. 4;

FIG. 6 is a fragmentary elevational view taken as indicated by the arrowed line 6—6 of FIG. 2;

FIG. 7 is a view similar to FIGS. 1 and 2, but illustrating the condition of the transmission when the engine is running at substantially full speed with substantially maximum torque response from the driven shaft; and FIG. 8 is a view taken as indicated by the arrowed line 8—8 of FIG. 7.

DETAILED DESCRIPTION

Figure 1:
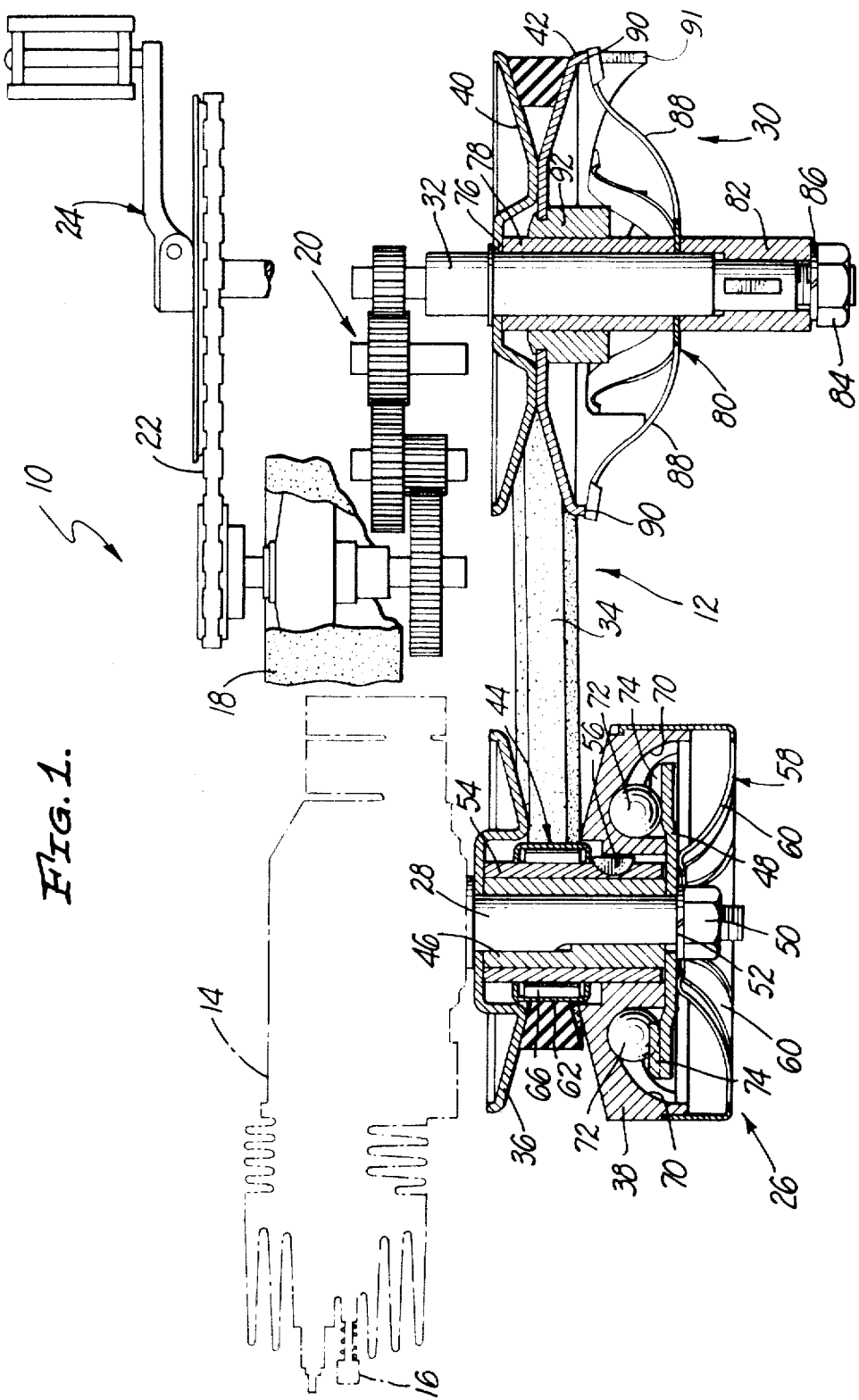
FIG. 1 illustrates the variable ratio belt-type transmission of the invention as used to interconnect the engine and driven wheel shaft of a pedal-equipped engine driven cycle, FIG. 1 illustrating the condition of the transmission prior to starting the engine, or with the engine idling.

Referring initially to FIG. 1 of the drawings, illustrated fragmentarily therein is a pedal-equipped engine driven bicycle 10 provided with a variable ratio, belt-type transmission 12 of the invention, the transmission incorporating a pedal-operated engine starting means as will be described in detail hereinafter.

The bicycle 10 includes an engine 14 which is equipped with a compression release 16 to facilitate cranking of the engine prior to starting. The engine 14 drives a rear wheel 18 of the bicycle 10 through the transmission 12 of the invention and a gear train 20. Also connected to the rear wheel 18 by chain and sprocket drive 22 is a pedal assembly 24. As will be described in detail hereinafter, the engine 14 may be started by manual power applied to the pedal assembly 24, either with the bicycle 10 in motion, or with the driven wheel 18 thereof supported above ground level by a kick stand, or the like, not shown.

Considering the transmission 12 now in more detail, it includes a driving pulley or driving pulley assembly 26 on a driving shaft 28 of the engine 14, which driving shaft is preferably the crankshaft of the engine. The transmission 12 also includes a driven pulley or driven pulley assembly 30 on a driven shaft 32 which, in the particular construction illustrated, is a shaft carrying one of the gears of the gear train 20. The driven pulley 30 is connected to the driving pulley 26 by a V-belt 34 trained around the two pulleys.

As is conventional in a transmission of this type, the driving pulley 26 includes two coaxial, relatively axially movable, generally frusto-conical driving pulley members 36 and 38 which receive the V-belt 34 therebetween. More particularly, the driving pulley member 38 is movable axially toward and away from the driving pulley member 36 to increase and decrease the pitch diameter of the driving pulley 26. Similarly, the driven pulley 30 includes two coaxial, relatively axially movable, generally frusto-conical driven pulley members 40 and 42, the driven pulley member 42 being axially movable toward and away from the driven pulley member 40 to increase and decrease the pitch diameter of the driven pulley.

Carried by the engine shaft 28 between the driving pulley members 36 and 38, and engageable by the inner periphery of the V-belt 34, is an overrunning clutch or clutch means 44 which is engaged when the driven pulley 30 drives the belt, and which is disengaged when the driving pulley 26 drives the belt. Thus, the engine 14 may be started by means of pedal-generated power applied to the driven shaft 32 and delivered to the engine shaft 28 through the driven pulley 30, the belt 34, the clutch 44 and, as will be explained hereinafter, the driving pulley 26. Conversely, when the engine is running so that the clutch 44 is disengaged, power is transmitted from the driving shaft 20 to the driven shaft 32 through the driving pulley 26, the belt 34 and the driven pulley 30.

Considering the driving pulley 26 in more detail, the fixed driving pulley member 36 is clamped between an annular shoulder on the engine shaft 28 and a sleeve 46 keyed to the engine shaft. Clamped against the outer end of the sleeve 46 is a disc 48 retained by a nut 50 threaded on the outer end of the engine shaft 28, there being a lock washer 52 between the nut and the disc.

Rotatable on the sleeve 46 is an outer sleeve 54 on which the driving pulley member 38 is axially slidable. Relative rotation between the driving pulley member 38 and the outer sleeve 54 is prevented by a key 56. The movable driving pulley member 38 is biased axially away from the fixed driving pulley member 36, to tend to open the driving pulley 26 and thus reduce its pitch diameter, by a spring means 58 comprising circumferentially spaced, radially inwardly extending spring fingers 60 carried by the driving pulley member 38 and bearing against the disc 48.

The overrunning clutch 44 is conventional and, as best shown in FIG. 3, utilizes the sleeve 54 as its inner race. Telescoped over the sleeve 54 is an outer race 62 having circumferentially spaced ramps 64 which circumferentially approach the sleeve 54 in the counterclockwise direction, as viewed in FIG. 3. The inner periphery of the V-belt 34 engages the outer race 62, when the driving pulley 26 is open. When the V-belt 34 is driven in the clockwise direction, as viewed in FIG. 3, by the driven pulley 30, rollers 66 wedge between the ramps 64 and the sleeve 54 so that the clutch 44 is engaged. Conversely, when the driving shaft 28 provides the power, the clutch 44 is disengaged.

The movable driving pulley member 38 is provided in its outer surface with circumferentially spaced, circumferentially extending grooves 68 of circumferentially decreasing depth, as best shown in FIG. 5 of the drawings. Communicating with the deeper ends of the circumferential grooves 68 are radially extending grooves 70 of radially decreasing depth. As best shown in FIG. 4, each circumferential groove 68 cooperates with the corresponding radial groove 70 to provide a composite groove which is L-shaped and which is deepest at the angle of the L, the depth decreasing circumferentially of the groove 68 and radially of the groove 70 from the angle of the L. Each of the L-shaped composite grooves contains a ball 72.

During starting of the engine 14, pedal-generated power is transmitted to the V-belt 34 by the driven pulley 30 and the gear train 20. The V-belt 34 acts on the outer race 62 of the clutch 44 to engage the clutch, thereby angularly displacing the movable driving pulley member 38. Under such conditions, as best shown in FIG. 4, circumferentially spaced lugs 74 on the disc 48 fixed to the engine shaft 28 engage the balls 72 and force them toward the shallower ends of the circumferential grooves 68. This results in closing of the driving pulley 26 on the V-belt 34 to prevent slippage, and also results in torque transmission to the engine shaft 28 to crank the engine, this being done with the compression release 16 activated. When the engine speed is sufficiently high for starting, the compression release 16 is de-activated to enable the engine to start.

After the engine 14 has been started, and is running at idling speed, the engine shaft 28 rotates relative to the movable driving pulley member 38 sufficiently to permit the balls 72 to enter the deepest portions of the composite L-shaped grooves in the movable driving pulley member. This permits the driving pulley 26 to open so that it does not engage the V-belt 34. Also, the overrunning clutch 44 is now disengaged, and merely acts as an idler, permitting the engine 14 to run without transmitting any power to the driven pulley 30. It will be noted that when the engine 14 is running, the lugs 74 on the disc 48 engage the balls 72 to drive the movable driving pulley member 38, this condition being shown in FIG. 8. If the engine speed is now increased substantially above idling, centrifugal force urges the balls 72 radially outwardly in the grooves 70 to close the driving pulley 26 and thus increase its pitch diameter, the pitch diameter of the driven pulley 30 decreasing correspondingly. Thus, the drive ratio of the transmission 12 is shifted up.

Turning now to a more detailed consideration of the driven pulley 30, the fixed driven pulley member 40 is clamped against an annular shoulder 76 on the driven shaft 32 by a sleeve 78 on the driven shaft. A spring assembly 80 is clamped against the outer end of the sleeve 78 by an outer sleeve 82 keyed to the driven shaft 32 and retained by a nut 84 and a lock washer 86. The spring assembly 80 comprises evenly circumferentially spaced, radial arms 88, the outer ends of which bear against evenly circumferentially spaced cams. Each cam comprises a ramp 90 on the movable driven pulley member 42 which is rotatably mounted on the sleeve 78 by means of a central hub 92. Each cam also has a stop 91. The ramps each begin at one end adjacent the corresponding stop 91 and at a position toward the fixed driven pulley 40 and extend to a position spaced further away from the fixed driven pulley 40. The nut 84 has threads which threadably engage threads on shaft 20. The nut 84 and sleeve 82 form means for securing the spring against the end of the sleeve 78.

With the foregoing construction, when the bicycle 10 is being propelled by the engine 14, an increase in the load on the driven shaft 32 due, for example, to an upgrade, results in rotation of the movable driven pulley member 42 relative to the fixed driven pulley member 40, as the torque overcomes the thrust of the torque-sensing spring assembly 80. As a result, the pitch diameter of the driven pulley 30 is reduced to shift the drive ratio down in response to the increased load.

SUMMARY OF OPERATION

The operation of the transmission 12 has largely been explained in the course of describing its structure. Consequently, the operation will merely be summarized briefly in this section of the specification.

FIG. 1 of the drawings illustrates the condition of the transmission prior to starting the engine, or with the engine idling. Under such circumstances, the driving pulley 26 is open so that it does not engage the V-belt 34. If the engine is idling, the clutch 44 is disengaged and merely acts as an idler for the V-belt 34, without transmitting any power thereto.

During starting of the engine 14, the conditions shown in FIGS. 2 to 6 prevail. The driven pulley 30 is closed by the spring assembly 80 and pedal-generated power delivered to the driven pulley is transmitted by the V-belt 34 to the driving pulley 26. Movement of belt 34 causes clutch 44 to engage and drive collar 54 and hence move pulley member 38, thereby closing pulley 26. The driving pulley 26 is closed slightly to grip the V-belt 34 by the action of balls 72 in the circumferential grooves 68.

FIGS. 7 and 8 of the drawings illustrate conditions prevailing when the engine 14 is running at substantially full speed with substantially maximum torque response from the driven shaft. Under such conditions, the balls 72 have partially closed the driving pulley 26 and the torque responsive driven pulley 30 has opened partially in opposition to the action of the torque sensing spring assembly 80.

Although an exemplary embodiment of the invention has been disclosed for purposes of illustration, it will be understood that various changes, modifications and substitutions may be incorporated in such embodiment without departing from the spirit of the invention as defined by the claims which follow.

What is claimed is:

1. In a variable ratio belt-type transmission for transmitting power between a driving shaft and a driven shaft through a belt, the combination of:

a. a variable pitch diameter driving pulley for mounting on such driving shaft and comprising two coaxial, relatively axially movable, generally frusto-conical driving pulley members between which such belt is passed; and b. a variable pitch diameter driven pulley for mounting on such driven shaft and comprising 1. two coaxial, relatively axially movable, generally frusto-conical driven pulley members between which such belt is also passed, one of said driven pulley members being fixed and the other being movable relative to the fixed one in an axial direction, 2. the movable driven pulley member comprising a plurality of circumferentially spaced cams, each comprising a ramp surface, and 3. a spring for mounting on such driven shaft and comprising a plurality of circumferentially spaced, radially extending spring arms, each arm having an outer end bearing on one of said circumferentially spaced ramp surfaces, said spring normally applying a spring force on said ramps forcing the movable driven pulley member toward the fixed driven pulley member.

2. In a variable ratio belt-type transmission according to claim 1 comprising a sleeve affixed to said fixed driven pulley member for mounting on such driven shaft, the movable driven pulley member being rotatably mounted on said sleeve.

3. In a variable ratio belt-type transmission according to claim 2 comprising a hub rotatably mounting said movable pulley member on said sleeve.

4. In a variable ratio belt-type transmission according to claim 2 wherein said spring comprises a central opening affixed to said sleeve and through which such driven shaft may extend.

5. In a variable ratio belt-type transmission according to claim 4 comprising a threaded member for threading engagement with threads on such driven shaft and for securing said spring in an axial direction against said sleeve.

6. In a variable ratio belt-type transmission according to claim 5 wherein the central opening of said spring has a smaller opening than the outside of the first named sleeve and comprising a further sleeve having a larger outer surface than said central opening and positioned in between said threaded member and spring for engagement therebetween and for securing said spring in place against the first named sleeve.

7. In a variable ratio belt-type transmission according to claim 1 wherein said ramps are evenly spaced and symmetrically curved about the axis of rotation of said driven pulley.

8. In a variable ratio belt-type transmission according to claim 7 comprising a stop at one end of each ramp, the ramps each extending from a ramp position adjacent each stop toward the fixed driven pulley member to a ramp position which is further away from said fixed driven pulley member.

9. A variable pitch diameter driven pulley belt drive for mounting on a shaft, comprising:
   a. two coaxial, relatively axially movable, generally frusto-conical driven pulley members for mounting on such shaft and between which a belt is passed, one of said driven pulley members being fixed and the other being movable relative to the fixed one in an axial direction;
   b. said movable driven pulley member comprising a plurality of circumferentially spaced cams, said cams each comprising a ramp surface; and
   c. a spring for mounting on such shaft and comprising a plurality of circumferentially spaced, radially extending spring arms, each arm having an outer end bearing on one of said circumferentially spaced ramp surfaces, said spring normally applying spring force on said ramp surface forcing the movable driven pulley member toward the fixed arm pulley member.

10. A driven pulley belt drive according to claim 1 comprising a sleeve affixed to said fixed driven pulley member for mounting on such shaft, the movable driven pulley member being rotatably mounted on said sleeve.

11. A driven pulley belt drive according to claim 10 comprising a hub rotatably mounting said movable pulley member on said sleeve.

12. A driven pulley belt drive according to claim 10 wherein said spring comprises a central opening affixed to said sleeve and through which such shaft may extend.

13. A driven pulley belt drive according to claim 12 comprising a threaded member for threading engagement with threads on such shaft and for securing said spring in an axial direction against said sleeve.

14. A driven pulley belt drive according to claim 13 wherein the central opening of said spring has a smaller opening than the outside of the first named sleeve and comprising a further sleeve having a larger outer surface than said central opening and positioned in between said threaded member and spring for engagement therebetween and for securing said spring in place against the first named sleeve.

15. A driven pulley belt drive according to claim 9 wherein said ramps are evenly spaced and symmetrically curved about the axis of rotation of said driven pulley.

16. A driven pulley belt drive according to claim 15 comprising a stop at one end of each ramp, the ramps each extending from a ramp position adjacent each stop toward the fixed driven pulley member to a ramp position which is further away from said fixed driven pulley member.

17. A variable pitch diameter driven pulley belt drive for mounting on a shaft, comprising:
   a. two coaxial, relatively axially movable, generally frusto-conical driven pulley members for mounting on such shaft and between which a belt is passed, one of said driven pulley members being fixed and the other being movable relative to the fixed one in an axial direction;
   b. a sleeve affixed to and coaxial with said fixed driven pulley member;
   c. said movable driven pulley member comprising a hub rotatably mounted and axially slidable on said sleeve;
   d. said movable drive pulley member comprising a plurality of evenly circumferentially spaced cams, each comprising a ramp surface, said ramp surfaces being curved symmetrically about the axis of rotation of said driven pulley;
   e. a spring comprising a plurality of evenly circumferentially spaced, radially extending arms, each arm having an outer end bearing on one of said ramp surfaces and normally applying a force on such ramp surface, forcing the movable driven pulley member towards the fixed driven pulley member; and
   f. means for affixing said spring to said sleeve.

18. A driven pulley belt drive according to claim 17 comprising a stop at one end of each ramp, the ramps each extending from a ramp position adjacent each stop toward the fixed driven pulley member to a ramp position which is further away from said fixed driven pulley member.

19. A driven pulley belt drive according to claim 17 wherein said spring comprises a central opening affixed to said sleeve and through which such shaft may extend.

20. A driven pulley belt drive according to claim 19 comprising a threaded member for threading engagement with threads on such shaft and for securing said spring in an axial direction against said sleeve.

21. A driven pulley belt drive according to claim 20 wherein the central opening of said spring has a smaller opening than the outside of the first named sleeve and comprising a further sleeve having a larger outer surface than said central opening and positioned in between said threaded member and spring for engagement therebetween and for securing said spring in place against the first named sleeve.

* * * * *